United States Patent
Schröder et al.

[11] Patent Number: 5,821,863
[45] Date of Patent: Oct. 13, 1998

[54] RAIN SENSOR

[75] Inventors: Hans-Joachim Schröder, Wiesbaden; Reinhold Berberich, Frankfurt, both of Germany

[73] Assignee: VDO Adolf Schindling AG, Frankfurt, Germany

[21] Appl. No.: 846,778

[22] Filed: Apr. 30, 1997

[30] Foreign Application Priority Data

May 17, 1996 [DE] Germany ......................... 196 19 879.8

[51] Int. Cl.$^6$ .................................................. G08B 21/00
[52] U.S. Cl. ........................ 340/604; 340/601; 340/602; 318/483; 200/61.05
[58] Field of Search .................................. 340/604, 602, 340/601; 318/483, 443, 444, DIG. 2; 250/573, 227.25; 200/61.05

[56] References Cited

U.S. PATENT DOCUMENTS

| | | | |
|---|---|---|---|
| 4,554,493 | 11/1985 | Armstrong | 318/444 |
| 5,581,240 | 12/1996 | Egger | 340/602 |
| 5,668,478 | 9/1997 | Buschur | 324/690 |

*Primary Examiner*—Jeffery A. Hofsass
*Assistant Examiner*—Ashok Mannava
*Attorney, Agent, or Firm*—Martin A. Farber

[57] ABSTRACT

In a rain sensor, a sensor field is arranged between two windshield wiper blades which lie one above the other on a windshield. The sensor field is thus located outside of the field of view of the driver and is wiped by the lower windshield wiper blade. The sensor field is connected to an evaluation circuit arranged on a wiper motor by connecting lines which pass around the lower wiper blade.

6 Claims, 1 Drawing Sheet

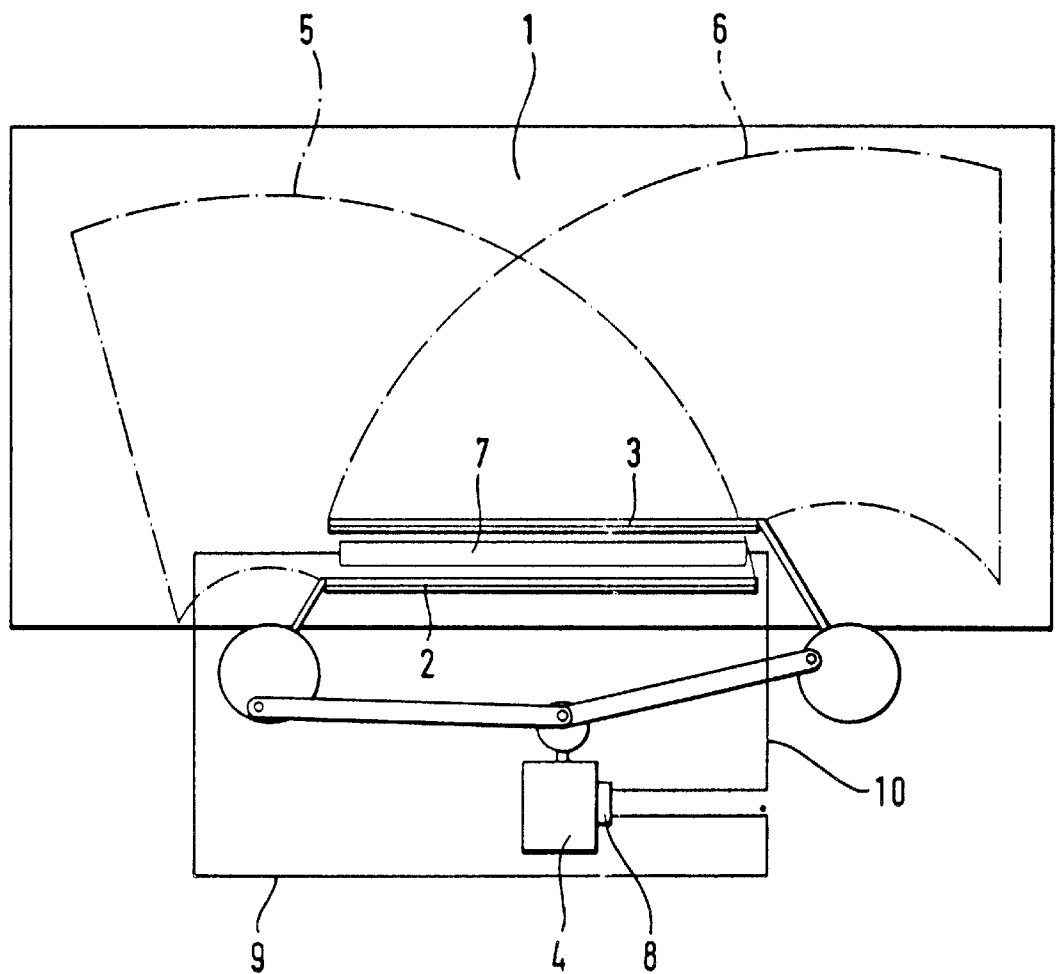

RAIN SENSOR

FIELD AND BACKGROUND OF THE INVENTION

The present invention relates to a rain sensor having a sensor field on a car windshield against which, in a position of rest, two windshield wiper blades rest one above the other in the plane of the windshield, a windshield wiper motor which drives the windshield wiper blades being controlled by an evaluation circuit as a function of a signal given off by the sensor.

Such rain sensors are used in modern motor vehicles in order automatically to turn the windshield wiper motor on when raindrops or splattered water strike the windshield. Since the sensor field generally has conductive paths made of a material which is non-transparent which are generally applied to the windshield, it is arranged outside the field of view of the driver. In the case of the windshield, the rain sensor is therefore frequently located in a region which is covered by the rear view mirror. In order that the windshield wiper be turned off after the elimination of raindrops or of splattered water, the sensor field must be arranged in the wiping region of the windshield wiper blades. In the case of motor vehicles which have two windshield wiper blades arranged in their basic position one above the other on the windshield, the windshield, however, is not wiped in the region of the rear view mirror.

SUMMARY OF THE INVENTION

It is an object of the invention so to develop a rain sensor of the aforementioned type that it does not impair the view of the driver and that moisture present on the sensor field is removed upon each operation of the wiper motor.

According to the invention, the sensor field (7) is arranged at a place between the two windshield wiper blades (2, 3) in their position of rest.

By this arrangement of the rain sensor, the sensor field is necessarily wiped by the lower wiper blade upon each wiping process. Furthermore, a short-circuiting of the sensor field such as could be caused by the conductor paths being bridged over by a wet wiper blade is excluded. Since, as a benefit of the invention, the sensor field is arranged on the windshield outside the field of view of the driver, impairing of his vision is reliably excluded.

After a wiping of the windshield by the wiper blades, a slight film of moisture as a rule remains on the sensor field. This film of moisture could lead to the wiper motor remaining in operation even though rain drops are no longer impinging on the windshield. The wiper motor is reliably turned off if, in accordance with an advantageous further development of the invention, the evaluation circuit is developed so as to establish, after each wiping process, a zero point of the signals of the sensor field (7) which leads to the turning off of the wiper motor (4).

The sensor field, which is arranged on the outside of the windshield, is contacted in simple manner with the evaluation circuit arranged within the vehicle if the sensor field (7)—in accordance with another advantageous further embodiment of the invention—is connected to the evaluation circuit (8) by connecting lines (9, 10) which extend through openings developed in the windshield (1). Such openings can be produced, for instance, by a laser beam.

The sensor field is contacted in simple manner with the evaluation circuit without having to fear that the connecting lines of the sensor field will be bridged over by a wet windshield wiper blade if the connecting lines (9, 10), in accordance with another advantageous further development of the invention, extend laterally around the lower windshield wiper blade (2) and around the lower edge of the windshield (1).

The invention permits of numerous embodiments.

BRIEF DESCRIPTION OF THE DRAWING

With the above and other objects and advantages in view, the present invention will become more clearly understood in connection with the detailed description of a preferred embodiment, when considered with the accompanying drawing, of which the sole figure shows the diagrammatic construction of a rain sensor in accordance with the invention for the windshield of a motor vehicle.

DETAILED DESCRIPTION OF THE PREFERRED EMBODIMENT

The drawing shows a windshield 1 on which, in their position of rest shown, two windshield wiper blades 2, 3 lie one above the other. The windshield wiper blades 2, 3 are driven by a common wiper motor 4. For greater clarity, the wiping regions 5, 6 of the windshield wiper blades 2, 3 are shown in dashed line in the drawing. An elongated sensor field 7 is arranged between the windshield wiper blades 2, 3 on the windshield 1. Upon the commencement of rain or in the case of splattered water, this sensor field 7 sends a signal to an evaluation circuit 8 which is connected to the windshield wiper motor 4. This evaluation circuit 8 is developed to control the wiper motor 4. Upon the commencement of rain, the windshield 1 and the sensor field 7 are wiped by the wiper blades 2, 3. Thereupon, the wiper motor 4 is turned off. Connecting lines 9, 10 leading from the sensor field to the wiper motor 4 pass laterally around the lower wiper blade 2 so as to avoid a short circuit by a wet wiper blade 2, 3.

We claim:

1. A rain sensor for a windshield of a vehicle, the vehicle having two windshield wiper blades which, in a position of rest of the two blades, are disposed horizontally in spaced apart relation, one above the other along a surface of the windshield, the sensor comprising:

a sensor field disposed on the windshield, a windshield wiper motor which drives the windshield wiper blades, and an evaluation circuit which controls the motor as a function of a signal given off by the sensor field;

wherein the sensor field is arranged at a place between the two windshield wiper blades in their position of rest, and a first one of the wiper blades lies above the sensor field and a second of the wiper blades lies below the sensor field in the position of rest.

2. A rain sensor according to claim 1, wherein the evaluation circuit is operative to provide a sequence of wiping processes wherein, in each of the wiping processes, the motor is activated to drive the two blades with a wiping movement, the evaluation circuit establishing, after each wiping process, a zero point of a signal of the sensor field which leads to a turning off of the wiper motor.

3. A rain sensor according to claim 1, further comprising:

connecting lines extending through openings in the windshield for providing electrical connection between the sensor field and the evaluation circuit.

4. A rain sensor according to claim 3, wherein the connecting lines extend laterally from opposite ends of the sensor field around a lower one of the windshield wiper blades and around a lower edge of the windshield.

5. A rains sensor according to claim 1, further comprising connecting lines for electrically connecting the sensor field to the evaluation circuit; and wherein the connecting lines extend laterally from opposite ends of the sensor field around a lower one of the windshield wiper blades and around a lower edge of the windshield to prevent a shorting of the connecting lines by wetness of one of the wiper blades.

6. A rain sensor according to claim 1, further comprising:

connecting lines extending through openings in the windshield for providing electrical connection between the sensor field and the evaluation circuit; and wherein the connecting lines are spaced away from a path of travel of a lower one of the blades to prevent a shorting of the connecting lines by wetness of one of the wiper blades.

\* \* \* \* \*